No. 803,074. PATENTED OCT. 31, 1905.
T. C. SMITH & W. A. MARTIN.
PHOTOGRAPHIC FLASH LIGHT APPARATUS.
APPLICATION FILED JAN. 30, 1905.
3 SHEETS—SHEET 1.
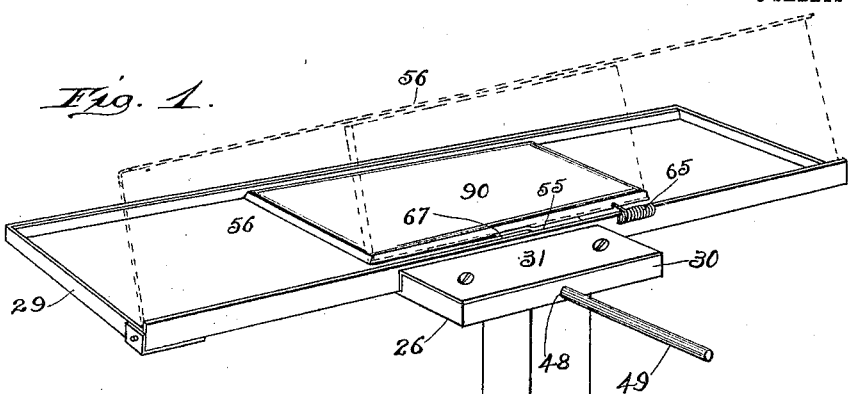
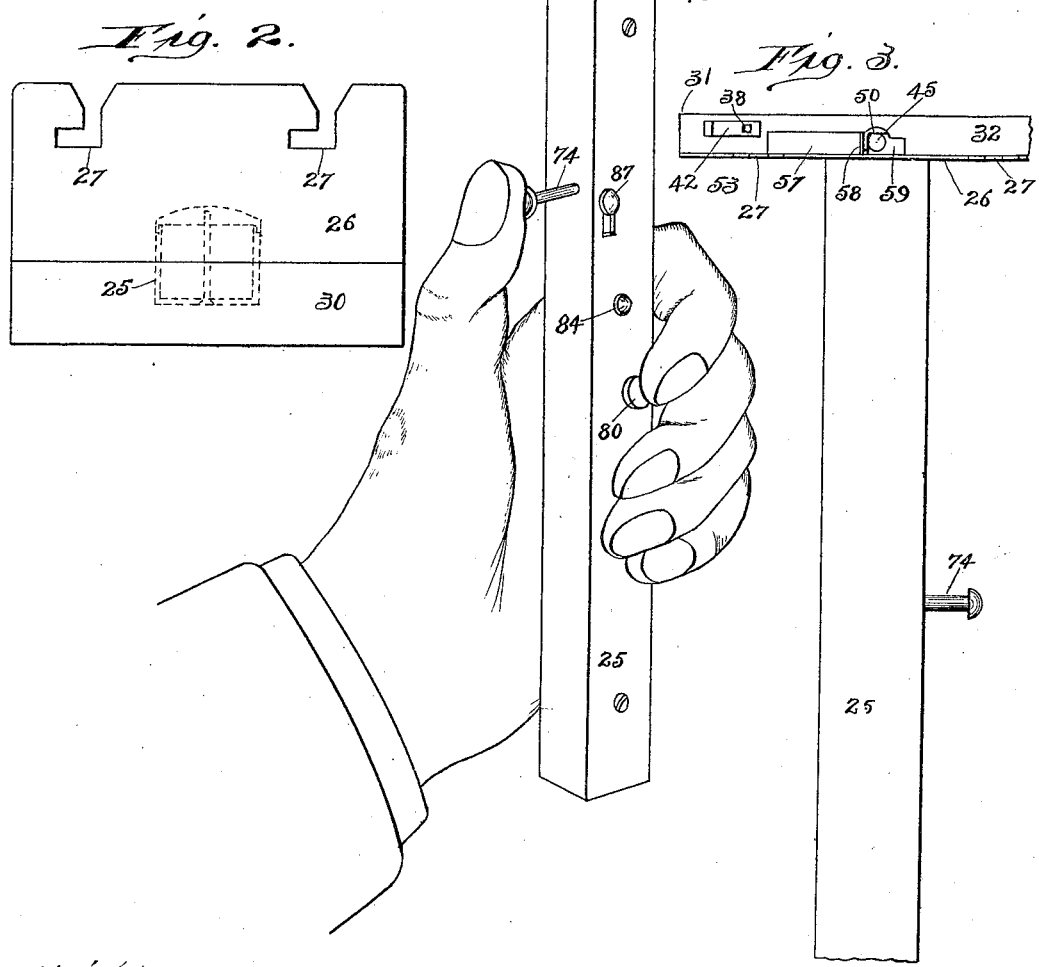
Witnesses:
Chas. E. Gorton
A. Gustafson
Inventors:
Thomas C. Smith and
Washington A. Martin
By Chas. C. Tillman Atty

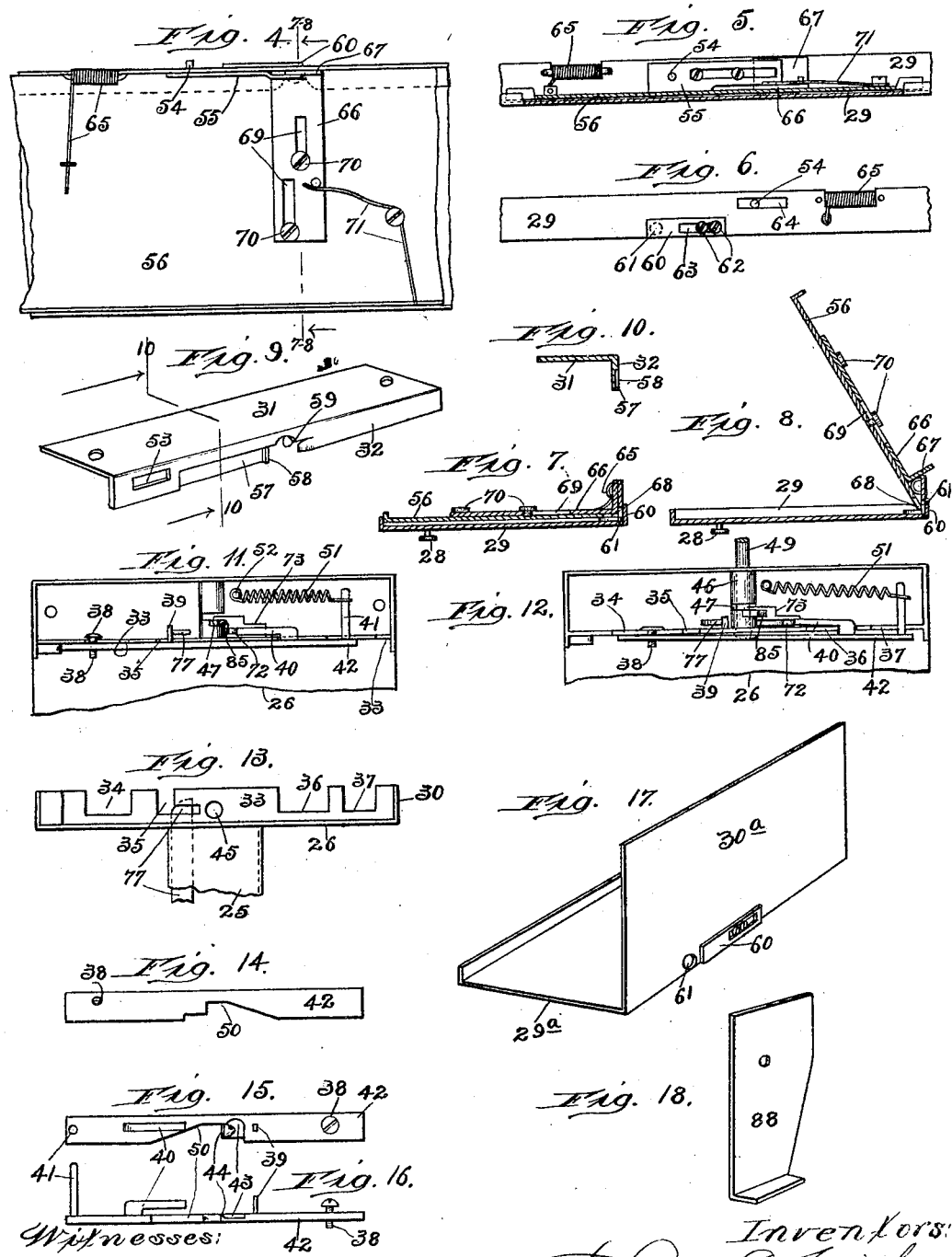

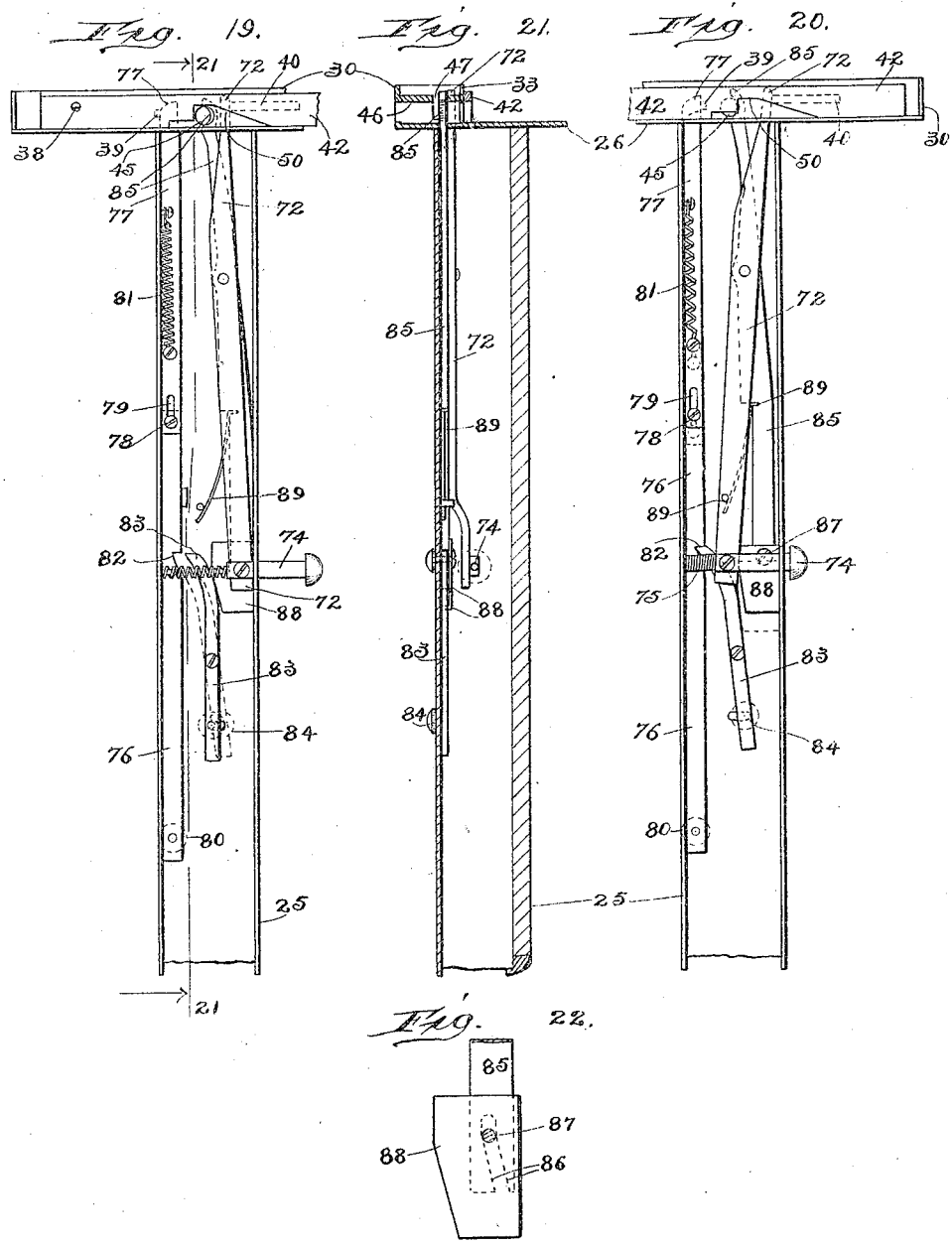

UNITED STATES PATENT OFFICE.

THOMAS C. SMITH AND WASHINGTON A. MARTIN, OF CHICAGO, ILLINOIS.

PHOTOGRAPHIC FLASH-LIGHT APPARATUS.

No. 803,074.  Specification of Letters Patent.  Patented Oct. 31, 1905.

Application filed January 30, 1905. Serial No. 243,224.

*To all whom it may concern:*

Be it known that we, THOMAS C. SMITH and WASHINGTON A. MARTIN, citizens of the United States, residing at Chicago, in the county of Cook and State of Illinois, have invented certain new and useful Improvements in Photographic Flash-Light Apparatus, of which the following is a specification.

This invention relates to improvements in an apparatus to be used by photographers for creating an instantaneous and brilliant light by the use of powder in order that good, clear, and sharply-defined photographs may be produced; and it consists in certain peculiarities of the construction, novel arrangement, and operation of the various parts thereof, as will be hereinafter more fully set forth and specifically claimed.

The principal object of the invention is to provide a portable and manually-operated flash-light apparatus which shall be simple and inexpensive in construction, compact in form, strong, durable and effective, and safe in operation, with its parts so constructed and arranged that the inflammable powder employed for producing the light will be protected from the wind or displacement, as well as against accidental ignition.

Another object is to provide a flash-light apparatus in which ordinary percussion-matches may be used for igniting the powder.

Numerous other objects and advantages of the invention will be disclosed in the subjoined description and explanation.

In order to enable others skilled in the art to which our invention pertains to make and use the same, we will now proceed to describe it, referring to the accompanying drawings, in which—

Figure 1 is a rear perspective view of a flash-light apparatus embodying our invention, showing the parts in position and a hand of the operator in the act of producing the flash or light and illustrating by dotted lines the raised position of the protecting-cover for the powder. Fig. 2 is a plan view of the supporting-plate which carries the firing mechanism, showing the powder-pan removed. Fig. 3 is a front view in elevation thereof, showing said plate mounted on the handle. Fig. 4 is a fragmental plan view of a portion of the powder-pan and a part of the cover therefor, illustrating the means for releasing and automatically raising the latter. Fig. 5 is a face view, partly in section and partly in elevation, of said parts. Fig. 6 is a rear view in elevation thereof. Fig. 7 is a cross-sectional view taken on line 7 7 of Fig. 4 looking in the direction indicated by the arrows. Fig. 8 is a similar view taken on the same plane, but showing the cover for the pan in its raised position. Fig. 9 is a detached perspective view of the cap or cover for the casing which contains the firing mechanism. Fig. 10 is a cross-sectional view taken on line 10 10 of Fig. 9 looking in the direction indicated by the arrows. Fig. 11 is a fragmental plan view of the supporting-plate and casing for the firing mechanism, showing the latter parts in their normal positions. Fig. 12 is a similar view thereof, showing the parts in the positions they will occupy when ready to fire or ignite the match and illustrating the same in positions. Fig. 13 is a face view of the supporting-plate and casing for the firing mechanism and a part of the handle, showing said mechanism removed. Fig. 14 is a detached outer view of the firing or igniting slide. Fig. 15 is a similar view of the inner surface thereof. Fig. 16 is an edge view. Fig. 17 is a perspective view of the powder-pan, showing a modification in its construction. Fig. 18 is an inner perspective view of the cam used for operating the safety-lever. Fig. 19 is a face view of the handle and a portion of the supporting-plate, showing a portion of the handle removed in order to disclose the parts employed to operate the firing mechanism. Fig. 20 is a similar view of like parts, showing the positions thereof when holding the match and illustrating the firing or igniting slide in its cocked position and the safety-lever set. Fig. 21 is a vertical sectional view taken on line 21 21 of Fig. 19; and Fig. 22 is a detail view of a portion of the match-holding or locking lever, showing the cam thereon for operating the same as well as the safety-lever.

Like numerals of reference refer to corresponding parts throughout the different views of the drawings.

The reference-numeral 25 designates the handle, which is hollow and may be made of any suitable size, form, and material. Secured on the upper end of the handle is a supporting-plate 26, which has in its front edge two bayonet-slots 27 to receive headed projections 28 on the lower surface of the powder-pan 29, which slots and projections afford what may be termed "bayonet-catches" and convenient means for detachably connecting said parts. The plate 26 is provided on its upper surface at its rear edge with a box-like casing 30 for the retention of the firing mechanism, and said casing has a detachable cover 31, the front edge of which is provided with a downturned flange 32 to overlap the front wall 33 of said casing. As is clearly shown in Fig. 13 of the drawings, the front wall 33 of the casing 30 is provided with a series of recesses 34, 35, 36, and 37 for the reception and operation of the projections 38, 39, 40, and 41, respectively, on the inner surface of the firing or igniting slide 42, which is also provided on its inner surface with a depression 43 to receive the head of the match when it is inserted for the purpose of igniting the powder. At one of the edges of the depression 43 the slide 42 is provided with a tooth 44 to engage the head of the match. As shown in Figs. 11, 15, and 16, the projection 40 extends inwardly from the inner surface of the slide 42 and then parallel therewith at a slight distance therefrom, thus inwardly overlapping a portion of the wall 33, which is provided at about its middle with an opening 45 to receive the match. The inner surface of the wall 33 is provided around the opening 45 therein with a tubular extension 46, which is formed with a recess 47 for the operation of the upper end of the match-holding lever. The rear wall of the casing 30 is provided with an opening 48 for the match 49, which opening registers with the opening 45 in the front wall of the casing.

As shown in Figs. 14 and 15, the slide 42 is formed in its lower edge with a recess 50, which terminates abruptly at the edge of the depression 43, having the tooth 44 thereon, so that when the slide is moved in one direction the recess 50 will expose the opening 45 in the front wall, and thus place the casing in communication with the powder-pan, as will be presently explained. Secured at one of its ends to the projection 41 on the slide 42 is a spring 51, which has its other end secured to a pin 52 on the bottom of the casing, and this spring is employed to actuate the firing or igniting slide. The downturned flange 32 of the cover 31 for the casing is provided near one of its ends with a longitudinal slot 53 for the reception and operation of a rearwardly-projecting pin 54, which is secured to a releasing-slide 55 for the cover 56 of the powder-pan. The flange 32 is also provided on its outer surface with a longitudinal depression 57, which extends from near the inner end of the slot 53 to about the middle of the flange and terminates in an outwardly-turned portion or tooth 58. At the inner end of the depression 57 the flange 32 is provided with an opening 59 to register with the opening 45 in the front wall of the casing. The depression 57 is employed to receive a sliding plate 60 on the rear wall of the pan 29, which plate is employed to open and close the opening 61 in said pan, which opening registers with the opening 45 in the front wall of the casing and leads into the pan or powder-chamber beneath the cover 56 therefor. The plate 60 is movably held on the rear wall of the pan by means of screws 62, which pass through a slot 63 in said plate. The pin 54 on the releasing-plate 55 projects through a slot 64 in the rear wall of the pan and when the pan is secured in place on the supporting-plate 26 will project into the slot 53 of the flange 32 of the casing-cover and engage the front end of the pin 38 on the igniting or firing slide. When the pan is thus placed in position, the tooth or forward projection 58 on the cover 31 will engage the end of the plate 60, adjacent to the touch-hole 61 in the rear wall of the pan, so that when the pan 29 is moved in the proper direction in the slots 27 of the supporting-plate the plate 60 will be moved from over the openings 61, and at the same time the releasing-plate 55, through the instrumentality of the pin 54 and projection 38 on the striking-slide, will be moved so as to almost release the cover 56 of the pan. This cover is pivotally secured at its rear edge to the rear of the pan and is automatically raised by means of a spring 65, which is secured at one of its ends to the rear wall of the pan and loosely secured at its other end to said cover. Located on the upper surface of the cover at about its middle is a plate 66, which has its rear end formed with an upturned flange 67, which rests against the inner surface of the rear wall of the pan and is used to open and close the opening 68 in the rear edge of the cover, which opening registers with the opening 61 in the rear wall of the pan. The plate 66 is provided with slots 69 for screws 70, secured to the upper surface of the cover so as to permit said plate to move back and forth across the cover, and is actuated by means of a spring 71, one end of which engages the cover and the other end said plate. When the releasing-plate 55 is slid entirely from the plate 66, it is apparent that the spring 65 will cause the cover 56 to automatically rise to the positions shown by dotted lines in Fig. 1 and by continuous lines in Fig. 8 of the drawings, in which operation the flange 67 on the plate 66, acting against the rear wall of the pan, will cause said plate to be moved forwardly, thus opening the hole 68 in the cover. When the cover is pressed downward, the spring 71 will force the plate 66 back to its normal position, thus closing said opening.

Fulcrumed in the upper portion of the handle 25 is a cocking-lever 72, the upper end of which extends through an opening 73 in the bottom of the casing 26 and rests against the inner end of the projection 40 on the striking-slide. Pivotally secured on the lower end of the lever 72 is a push-pin 74, which projects through an opening in one side of the handle 25 and is actuated by a spring 75, located between its inner end and the opposite side of the handle. Longitudinally located in the handle is a firing-trigger, which comprises two pieces or bars 76 and 77, which are loosely connected together at their inner ends by means of a screw 78 and a slot 79, through which the screw passes. The lower end of the portion 76 of the firing-trigger is provided with a push pin or button 80, which extends through an opening in the rear portion of the handle. The upper end of the portion 77 of said trigger is slightly rounded or beveled and projects through an opening in the bottom of the casing 30, so as to engage the projection 39 on the striking-slide. The portion 77 is upwardly actuated by means of a spring 81, which is secured at one of its ends to said part and at its other end to the handle. The part 76 of the firing-trigger is provided on its inner edge with a catch 82 to receive the upper end of a safety-lever 83, which is fulcrumed on the rear portion of the handle and has on its lower portion a push-pin 84, which extends through the rear portion of the handle for operating said lever. Projecting at its upper end through the opening 73 in the casing is a locking or holding arm 85 for the match 49, and said end of this arm is preferably curved, as shown in Figs. 19 and 20 of the drawings. The lower portion of the arm 85 is provided with an inclined slot 86 for the operation of the push-pin 87, which extends through the rear portion of the handle and is used for operating said arm, as well as for setting the safety-lever 83, so as to lock the parts against accidental firing. Mounted on the inner portion of the push-pin 87 is a cam 88, the inclined surface of which is adapted to impinge the curved portion of the safety-lever 83, so as to throw it into engagement with the portion 76 of the firing-trigger. The locking-arm 85 is actuated outwardly by means of a spring 89, which is secured at one of its ends to the handle and at its other end to said arm. By pressing downwardly on the pin 87 it is apparent that the arm 85 will be moved in said direction, and as said pin 87 is located in the inclined slot 86 of said arm the upper end thereof will be removed from the recess 47 in the tube 46, so as to permit the match being inserted in said tube, when by releasing the pin 87 the spring 89 will cause the arm 85 to be moved and by the action of the pin 87 in the slot 86 cause it to be thrown back into the recess 47, so as to firmly hold the match near its head. In the above-named operation the inclined surface of the cam 88 will force the safety-lever 83 into engagement with the catch 82 on the portion 76 of the firing-trigger.

Instead of using a powder-pan with a pivoted protecting-cover, as shown in Figs. 1, 4, 7, and 8 of the drawings and above described, we may use an ordinary pan 29ª, having its rear wall 30ª extended upwardly, but rigid with the pan, in which construction the same means of fastening it to the supporting-plate and for uncovering the touch-hole 61, as above described, may be employed.

The operation of the apparatus is simple and as follows: When the powder-pan 29, with the protecting-cover, is employed, the actuating means of which may be inclosed by means of a flanged plate 90, secured on the upper surface of said cover, powder may be placed in said pan by moving the releasing-bar 55 in the proper direction, which may be done by means of the pin 54, which projects through the rear wall of said pan, thus permitting the cover to automatically rise. When a sufficient quantity is placed in the pan and properly distributed, so that a portion thereof will be located in the touch-holes 61 and 68 of the pan and cover, respectively, the latter may be lowered and fastened in its lowered position by replacing the releasing-plate 55, so as to engage the sliding plate 66 on the upper surface of the cover. By placing the projections 28 on the lower surface of the pan in the slots 27 of the supporting-plate it is evident the pin 54 will project into the slot 53 of the flange 32 on the casing-cover and that the depression 57 in said cover will receive the sliding piece 60 on the pan, so that the tooth 58 on the flange 32 will engage one end of the piece 60, when by sliding the pan sidewise on the supporting-plate, which operation is permitted by reason of the bayonet-catches 27, the piece 60 will be moved away from the touch-hole 61 in the pan. When in this position, it will be understood that the releasing-plate 55 on the pan has been moved so as to be almost out of engagement with the plate 66 on the upper surface of the cover, but still engages said plate sufficiently to hold it in its lowered position. By pressing the cocking-pin 74 inwardly it is apparent the cocking-lever 72 will be thrown to the position indicated in Fig. 20, which operation will move the firing-slide 42 to the position shown in Fig. 12, thus closing the opening in the front wall of the casing. When thus cocked, the safety-lever 83 may be set by pushing the pin 87 downwardly, which operation will also remove the locking-arm 85 from the tube 46, so as to permit the match 49 being inserted through the opening 48 in the rear wall of the casing. When thus inserted, pressure may be removed from the pin 87, when the arm 85 will engage the match near its head and firmly hold it in position. When the parts are arranged as above stated, it will be understood that the head of the match will lie in the depression 43 of the striking-slide 42, so that the tooth 44 thereon may strike or engage the match-head. By releasing the safety-lever 83 from the portion 76 of the firing-trigger, which may be done by moving the pin 84 in the proper direction, it is apparent that the match may be fired or ignited by simply pressing down on the firing-pin 80, which through the instrumentality of the portion 76 will release the upper portion 77 of the firing-trigger from the projection 39 on the firing-slide, when the latter will be retracted to the position shown in Fig. 11 by reason of the spring 51, which actuates said slide. In thus retracting the slide the front end of the projection 38 will strike the pin 54 on the releasing-plate 55, thus permitting the cover 56 of the pan to be automatically lifted just before the explosion of the match-head takes place, which explosion is produced by the engagement of the tooth 44 on the striking-plate 42 with said head. As the striking-plate is retracted it is apparent that the recess 50 therein will be brought over the opening 45 in the front wall of the casing, so as to open the same, thus permitting the flame of the match to pass through the openings or touch-holes 61 and 68 of the pan and cover therefor, thus igniting the powder and creating the desired light. When a pan $29^a$ of the construction shown in Fig. 17 is employed, the operation is substantially the same as just above described. When pressure is removed from the pin 80, it is apparent that the spring 81 will retract the part 77 of the firing-trigger, so that its upper portion will regain its proper position.

Having thus fully described our invention, what we claim as new, and desire to secure by Letters Patent, is—

1. In a photographic flash-light apparatus, the combination with the supporting-handle, of a firing mechanism mounted thereon, a powder-pan supported on the handle, a cocking-lever for said mechanism located in the supporting-handle and projecting therefrom to engage a portion of the firing mechanism, and means to release said cocked mechanism, substantially as described.

2. In a photographic flash-light apparatus, the combination with the supporting-handle, of a casing mounted thereon and provided with means to receive and hold a percussively-ignitible substance, a powder-pan connected to the casing and adapted to communicate therewith, a firing mechanism in said casing, a cocking-lever fulcrumed on the handle and projecting into the casing to cock the said mechanism, and means to release the cocked mechanism so as to cause said substance to be ignited, substantially as described.

3. In a photographic flash-light apparatus, the combination with the supporting-handle, of a casing mounted on one end thereof and provided in its front and rear walls with an opening to receive a percussion-match, a powder-pan connected to the casing and adapted to communicate therewith, a firing mechanism in said casing, a cocking-lever fulcrumed on the handle and projecting into the casing to cock the said mechanism, and a firing-trigger located on the handle and projecting into the casing to release the cocked mechanism so as to ignite the match, substantially as described.

4. In a photographic flash-light apparatus, the combination with the supporting-handle, of a casing mounted on one end thereof and provided in its front and rear walls with an opening to receive a percussion-match, a powder-pan connected to the casing, a firing mechanism in said casing, a cocking-lever fulcrumed on the handle and projecting into the casing to cock said mechanism, a firing-trigger located on the handle and projecting into the casing to release the cocked mechanism so as to ignite the match, and a locking-arm on the handle to hold the match, substantially as described.

5. In a photographic flash-light apparatus, the combination with the supporting-handle, of a casing mounted thereon and provided in its front and rear walls with an opening, a powder-pan connected to the casing and adapted to communicate therewith, a firing mechanism in said casing, a cocking-lever fulcrumed on the handle and projecting into the casing, a firing-trigger on the handle and projecting into the casing, and a safety-lever on the handle and adapted to engage the said trigger, substantially as described.

6. In a photographic flash-light apparatus, the combination with the supporting-handle, of a casing mounted thereon and provided in its front and rear walls with an opening, a powder-pan connected to the casing and adapted to communicate therewith, a firing mechanism in said casing, a cocking-lever fulcrumed on the handle and projecting into the casing, a firing-trigger and a locking-arm on the handle and projecting into the casing, and a safety-lever on the handle and adapted to engage the said trigger, substantially as described.

7. In a photographic flash-light apparatus, the combination with the supporting-handle, of a casing mounted on one end thereof and provided in its front and rear walls with an opening, a powder-pan connected to the casing and adapted to communicate therewith, a spring-actuated cover for said pan, means to hold the cover in its lowered position, a firing mechanism in the casing, a cocking-lever projecting into the casing, and means to release the cocked mechanism and the cover of the powder-pan, substantially as described.

8. In a photographic flash-light apparatus, the combination with the supporting-handle, of a casing mounted on one end thereof and provided in its front and rear walls with an opening, a powder-pan connected to the casing and adapted to have communication therewith, a spring-actuated cover for said pan, means to hold the cover in its lowered position, a firing mechanism in the casing, a cocking-lever projecting into the casing to cock said mechanism, a locking-arm projecting into the casing, and means to release the cocked mechanism and the cover of the powder-pan, substantially as described.

9. In a photographic flash-light apparatus, the combination with the supporting-handle, of a casing mounted on one end thereof and provided in its front and rear walls with an opening to receive a percussion-match, a powder-pan connected to the casing and adapted to communicate therewith, a firing mechanism in said casing, a cocking-lever fulcrumed on the handle and projecting into the casing to cock said mechanism, a firing-trigger located on the handle and projecting into the casing to release the cocked mechanism so as to ignite the match, a safety-lever on the handle and adapted to engage said trigger, a locking-arm movably supported on the handle and projecting into the casing so as to hold the match, and means on the lower portion of said locking-arm to move the safety-lever into engagement with the trigger, substantially as described.

10. In a photographic flash-light apparatus, the combination with the supporting-handle, of a casing mounted on one end thereof and having in its front and rear walls an opening, of a spring-actuated firing-slide movably mounted on one of said walls and having a recess in its lower edge, the said slide having on its inner surface a toothed depression and a number of projections, a cocking-lever fulcrumed on the handle and projecting into the casing so as to engage one of the projections on said slide, a firing-trigger located on the handle and projecting into the casing so as to engage another projection on said slide, substantially as described.

THOMAS C. SMITH.
WASHINGTON A. MARTIN.

Witnesses:
  CHAS. C. TILLMAN,
  A. GUSTAFSON.